United States Patent [19]

Meenen, Jr.

[11] Patent Number: 4,907,970
[45] Date of Patent: Mar. 13, 1990

[54] SIDESTICK-TYPE THRUST CONTROL SIMULATOR

[75] Inventor: Raymond P. Meenen, Jr., Huntington Station, N.Y.

[73] Assignee: Grumman Aerospace Corporation, Bethpage, N.Y.

[21] Appl. No.: 175,381

[22] Filed: Mar. 30, 1988

[51] Int. Cl.⁴ .............................................. G09B 9/08
[52] U.S. Cl. ................................... 434/45; 74/471 R; 74/491; 244/223
[58] Field of Search ....................... 434/45; 273/148 B; 272/1 C; 74/471 R, 491; 244/223, 225, 237

[56] References Cited

U.S. PATENT DOCUMENTS

| | | | |
|---|---|---|---|
| 2,804,698 | 9/1957 | Grandmont | 244/83 |
| 2,936,976 | 5/1960 | Greenland et al. | 244/83 |
| 2,940,699 | 6/1960 | Plummer | 244/83 |
| 3,024,539 | 3/1962 | Rider | 244/83 |
| 3,028,126 | 4/1962 | Holleman | 244/83 |
| 3,378,938 | 4/1968 | Frasca | |
| 3,523,665 | 8/1970 | Laynor, Jr. et al. | 244/83 |
| 3,771,037 | 11/1973 | Bailey, Jr. | 318/580 |
| 4,069,720 | 1/1978 | Thor | 74/471 R |
| 4,531,080 | 7/1985 | Nordstrom et al. | 318/628 |
| 4,574,651 | 3/1986 | Nordström | 74/491 |
| 4,646,869 | 3/1987 | Kerner, Jr. | 74/493 |

Primary Examiner—Leo P. Picard
Assistant Examiner—Jessica J. Harrison
Attorney, Agent, or Firm—Pollock, VandeSande & Priddy

[57] ABSTRACT

A simulator handgrip is connected to the shaft of a slip clutch which offers resistance to handgrip displacement, thereby simulating the "feel" of an actual thrust control for aircraft. Linkages are provided for measuring the amount of handgrip displacement as an electrical signal that may be utilized by a simulator computer. Adjustment devices are provided for moving the handgrip and clutch devices along a diagonal direction to accommodate pilots of different height.

2 Claims, 2 Drawing Sheets

SIDESTICK-TYPE THRUST CONTROL SIMULATOR

FIELD OF THE INVENTION

The present invention relates to aircraft simulation equipment, and more particularly to a sidestick device for simulating thrust control.

BACKGROUND OF THE INVENTION

When training pilots to fly developmental aircraft or existing aircraft to which a pilot is being introduced, it is usual to utilize simulators. Simulators are also used in the design evaluation of cockpits for new or proposed aircraft. This application requires a great deal of versatility in the simulation equipment as this simulation may take place initially in a simple wooden mockup of a cockpit and then progress to more sophisticated equipment such as motion base simulators and centrifuges. These devices simulate actual controls that the pilot will be employing during flight and must simulate the feel that a pilot will encounter during actual use of operational equipment.

Thrust control of modern high-performance jet aircraft is typically accomplished by fore/aft lever controls. In high-performance military aircraft, thrust control levers are also employed to "kick in" afterburners. However, since the utilization of afterburners consumes fuel at a very high rate, the thrust control must require an additional motion by the pilot to prevent inadvertent afterburner operation.

Although simulators exist, they often include little opportunity to adjust the thrust control components to enable rapid and fine adjustments over a wide range.

BRIEF DESCRIPTION OF THE PRESENT INVENTION

The present invention introduces a thrust control simulator with a conveniently utilized handgrip. A slip clutch is employed to resist fore/aft movement, the clutch being adjustable so that a proper "feel" can be achieved. In addition, means are provided for adjusting the position of the handgrip so that it can be comfortably held by a pilot.

Mechanical means are also installed on the simulator so that a compound motion is required by the pilot in order to initiate afterburner operation. In addition, means are provided to extend or limit the degree of fore/aft movement of the handgrip so as to simulate a comparable range for a particular aircraft.

Although the present invention is directed to a simulator, it is intended to present a conveniently operated handgrip control, in lieu of conventional levers currently employed by pilots.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figures 1, 2:
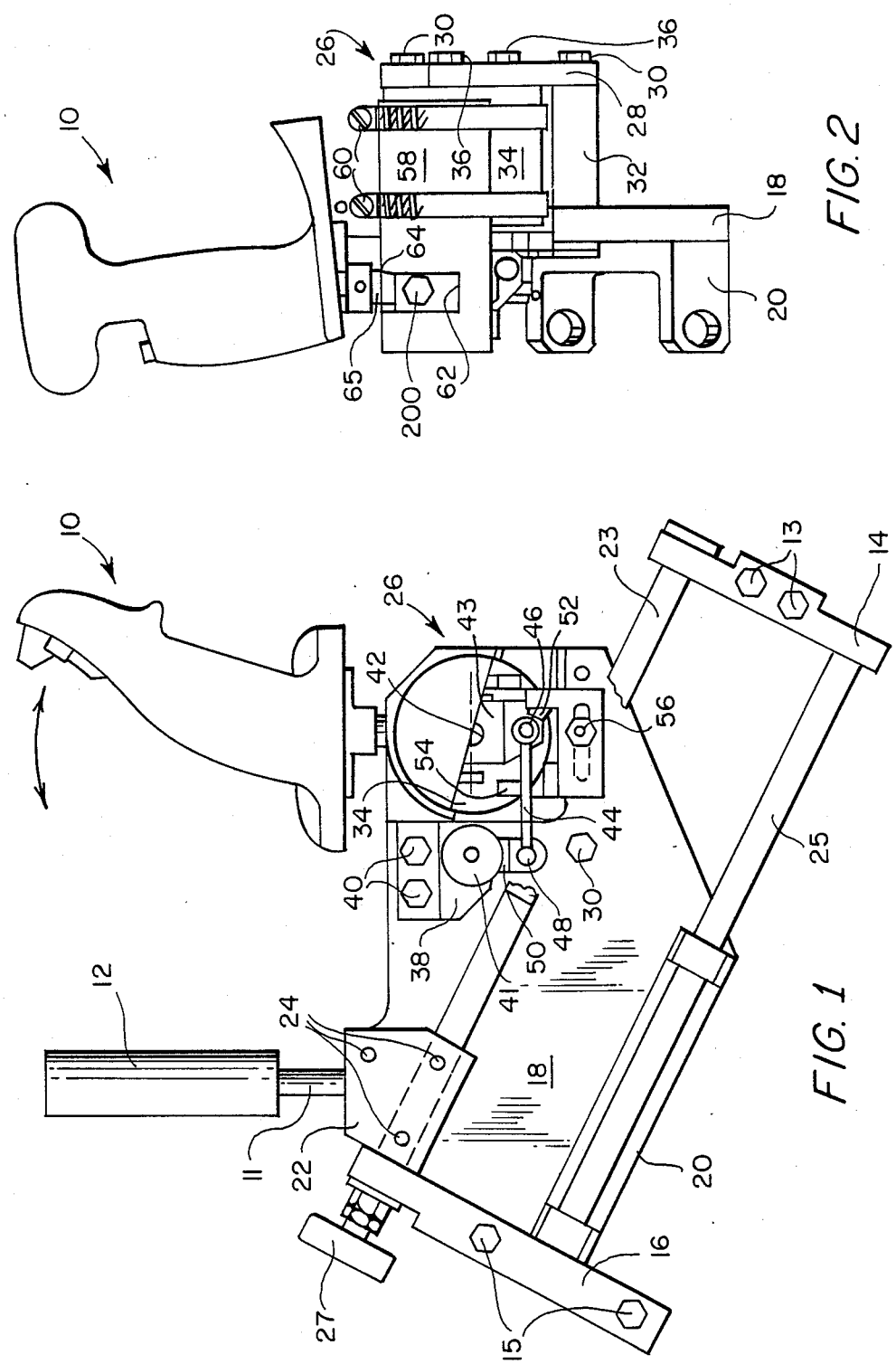
FIG. 1 is a first side elevational view of the present simulator.
FIG. 2 is a front view of the present simulator.
Figure 3:
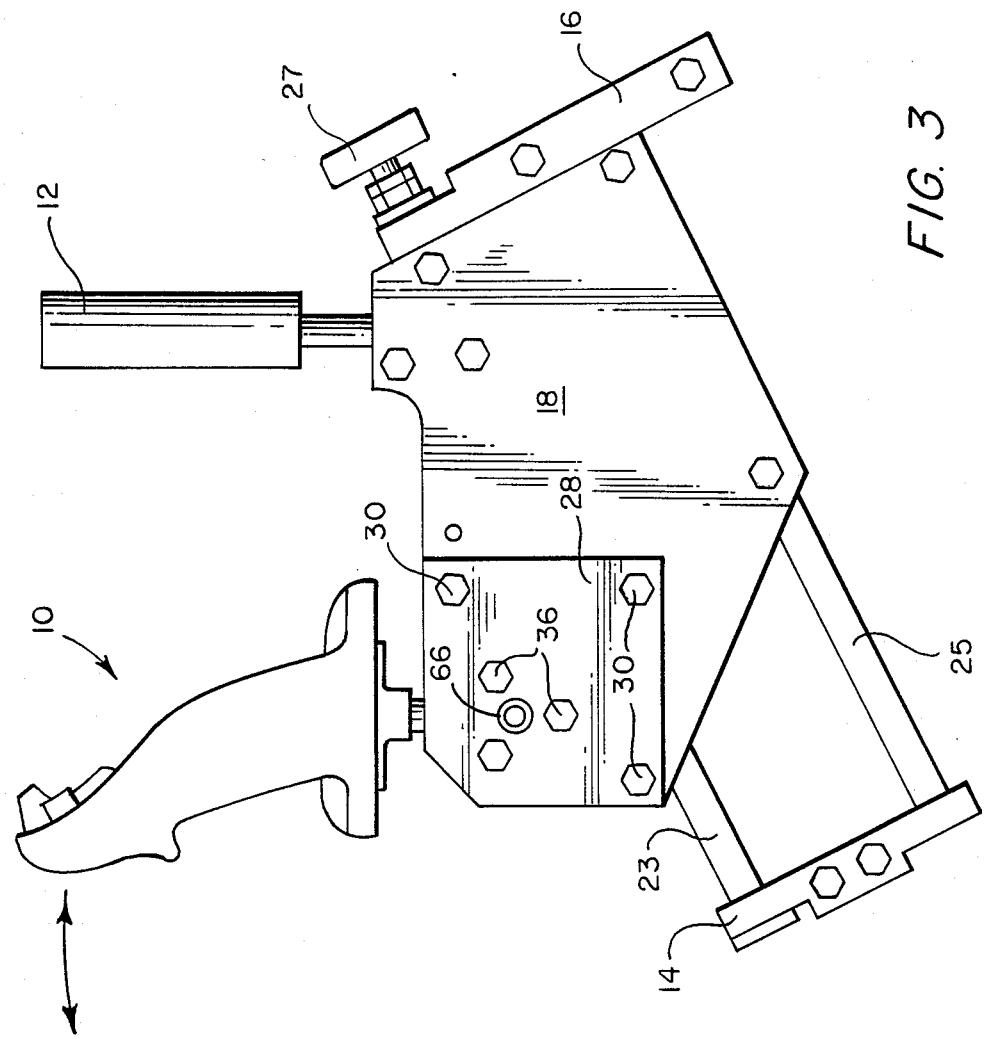
FIG. 3 is a second elevational view of the present simulator.

The thrust control simulator of the present invention is illustrated in FIGS. 1-3. A handgrip 10 undergoes fore/aft displacement as indicated by arrows in FIGS. 1 and 3. A wrist rest 12 is positioned in alignment with the handgrip 10 to support a pilot's wrist and enable more accurate variations in thrust. The handgrip 10 is easily replaceable so that various models may be quickly installed for simulations. Further, the handgrip 10 and wrist rest 12 may be adjustably mounted in the vertical direction to enable adjustments to be quickly made, thereby comfortably accommodating a pilot using the simulator. Two parallel spaced brackets 14 and 16 are secured to a console surface or pilot seat side by means of respective fasteners 13 and 15. A support plate 18 is supported by, and can move along, two rails 23 and 25 which are secured to the brackets 14 and 16. A lower rail support 20 is bolted to the plate 18 and is free to slide along the lower rail 25 on Teflon bushings (not shown). The upper support block 22 is also bolted to the plate 18 by means of fasteners 24. The position of the entire thrust control can be varied along a diagonal line which runs in a forward-down, up-aft direction along the rails 23 and 25 by turning hand wheel 27 on the aft end of the upper rail 23, which rides in journal bearings (not shown) and is therefore free to rotate. This adjustment allows a pilot to adjust the position of the thrust control assembly to suit his arm length. The upper block 22 receives a vertical threaded rod 11 which supports the wrist rest 12 and allows the height of the wrist rest to be adjusted by turning it one way or the other to raise or lower it.

A mechanical resistance assembly generally indicated by reference numeral 26 (FIG. 1) is mounted to plate 18 and provides the resistance necessary for the proper "feel" when moving the handgrip 10 in a fore/aft direction. The feel is designed to accurately simulate the feel of a thrust control of an actual aircraft. The assembly 26 includes a support 28 clearly shown in FIGS. 2 and 3 as mounting the components of the assembly. The support is secured to plate 18 by means of suitable fasteners 30. As shown in FIG. 2, spacers 32 maintain the secured position of support 28 in parallel spaced relationship to the plate 18.

The heart of assembly 26 is a skewed roller friction device 34, preferably a conventional slip clutch such as the type manufactured by the Western Gear Corporation of California. This clutch has a cylindrical body which is also secured to the support 28 by fasteners 36, as shown in FIGS. 2 and 3. The handgrip 10 is connected to the shaft 42 (FIG. 1) of the friction device 34 so that clutch resistance to rotational movement is transferred to the handgrip 10 and responds to fore/aft displacement of the handgrip.

In order to measure the degree of rotational motion corresponding to the amount of simulated thrust control, a transducer such as potentiometer 41 is provided. In a preferred embodiment of the invention, the potentiometer is mounted to a bracket 38, the latter being secured to plate 18 by fasteners 40. A linkage connects the shaft 42 of device 34 to the shaft of the potentiometer. This linkage includes vertical link 43 connected at a first end to shaft 42 and at a second pivotal end 46 to horizontal link 44. An opposite end of the latter link is connected at pivot point 48 to a second vertical link 50. The latter-mentioned vertical link is in turn connected to the shaft of potentiometer 41. Accordingly, each time the handgrip 10 is displaced in a fore/aft direction, the shaft 42 of friction device 34 rotates setting up a corresponding rotation in potentiometer 41, via the linkage members just described. It is important to note that although a potentiometer 41 is indicated as the transducer, other conventional types of transducers are available to perform a similar function. These include optical encoders and Linear Variable Differential Transformers. Although they are not shown, wires from the potentiometer or other transducer would be connected to a simulator computer for simulation measurements in accordance with known techniques which do not, per se, form part of the present invention.

Mechanical stops 52 and 54 (FIG. 1) are individually slidably mounted with respect to fixed fastener 56. The purpose of these stops is to limit the fore/aft potential travel of the handgrip 10.

As previously explained, the present invention offers simulation for afterburner operation. However, it is desirable to require a handgrip movement in order to simulate handgrip movement which would energize afterburners in an actual aircraft. This concern for afterburner energization is due to the fact that fuel consumption is quite high during afterburner operation.

In order to achieve the required motion, a semi-cylindrical plate 58 (FIG. 2) is coaxially mounted over the body of the friction device 34. It is held in place by means of hose clamps 60. Of course, other types of securement are quite possible. The plate 58 includes a notch 62 that may be characterized as a straight portion connecting to an offset portion 64. It is this offset or zig-zag portion which must be traversed by the support shaft 65 of handgrip 10 in order to simulate afterburner operation. The handgrip 10 is attached to shaft 65 which, in turn, is mounted to the upper end of link 43 via a clevis type arrangement which allows it to rotate in a lateral direction about pivot 200 (FIG. 2). In addition, a spring-loaded detent mechanism (not shown) is mounted on link 43 and causes the handgrip to assume one of the two lateral positions corresponding to normal or afterburner operation. Accordingly, if the pilot wishes to enter an afterburner zone with the handgrip 10, he must execute a zig-zag motion and overcome the spring force of the lateral detent thereby avoiding inadvertent simulation of afterburner operation by an accidental simple rotational displacement of the handgrip.

Friction force, or feel force, is determined by the pre-load adjustment of the friction device 34. This may be varied by screwing a threaded adjustment screw 66 (FIG. 3) to obtain the desired amount of friction or "feel".

According to the previous discussion, it will be appreciated that the present invention allows for the evaluation of a seat-mounted sidestick type of control for engine thrust and can serve as a tool for the analysis of thrust control concepts in various advanced cockpit mockups.

It should be understood that the invention is not limited to the exact details of construction shown and described herein for obvious modifications will occur to persons skilled in the art.

I claim:

1. An aircraft thrust control simulator comprising:
   a handgrip having a mounting shaft;
   a slip clutch having a shaft extending transversely of the handgrip shaft and connected thereto for imparting preselected friction in response to displacement of the handgrip;
   linkage means connected at a first end to the handgrip shaft for translating handgrip displacement to a corresponding linkage displacement;
   transducer means connected to a second end of the linkage means for electrically measuring the handgrip displacement;
   a support means for mounting all of the above-indicated means;
   a pair of parallel spaced threaded rails mounting the support means;
   adjusting means connected to the rails for threadingly screwing the rails relative to the support means thereby displacing the handgrip to a position particularly suited for a pilot.

2. The structure set forth in claim 1 together with a semi-cylindrically notched plate juxtaposed against the slip clutch and through which the handgrip extends, the plate notch having an irregular pattern requiring compound displacement of the handgrip along the notch thereby simulating afterburner energization of a jet aircraft.

* * * * *